(No Model.)
E. W. G. C. HOFFMANN.
ELECTRIC BRAKE.
No. 606,167. Patented June 21, 1898.
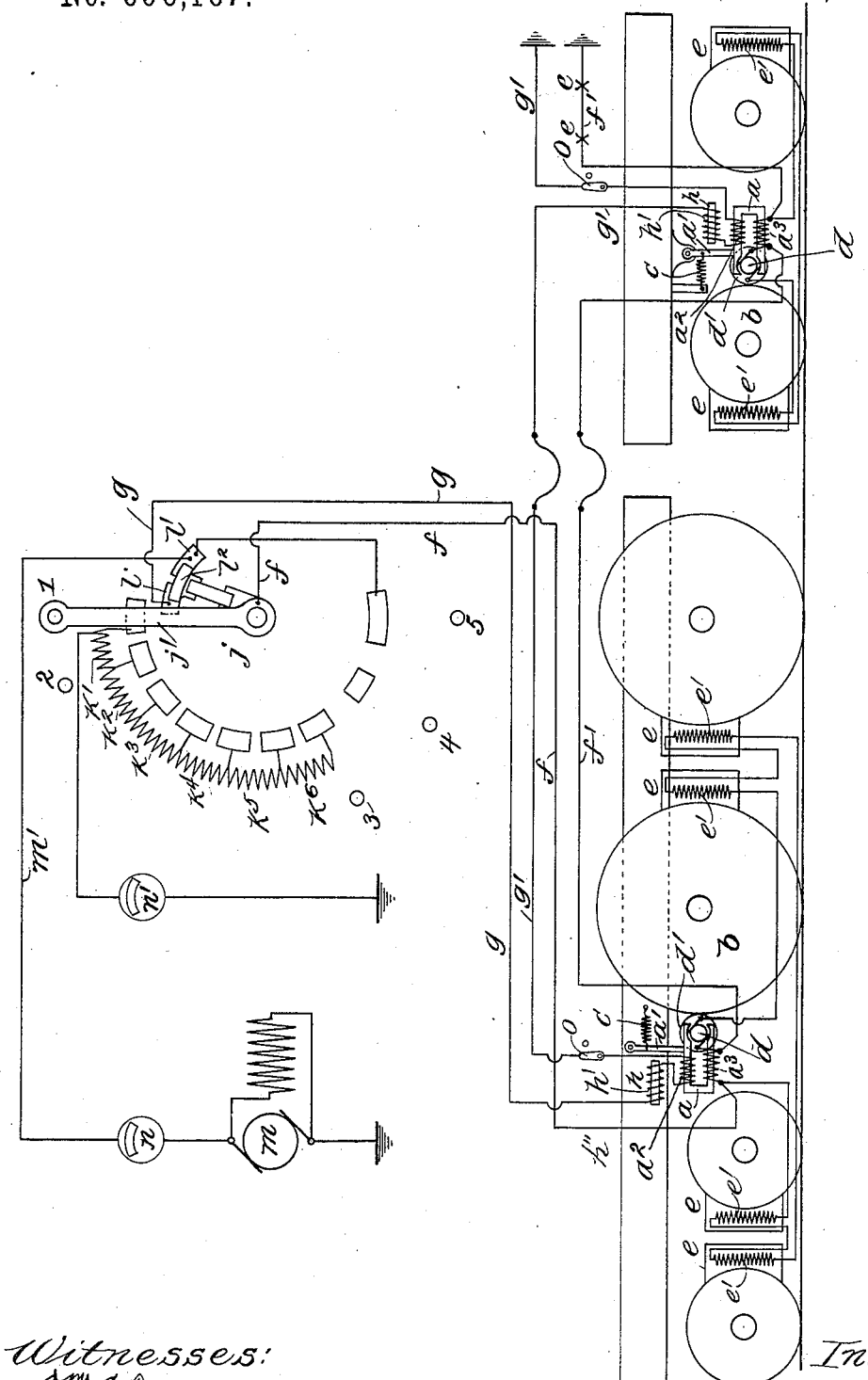
Witnesses:
J. W. C. Danner
A. B. Lawrence
Inventor
E. W. G. C. Hoffmann,
By Barton & Brown
Attorneys.
THE NORRIS PETERS CO., PHOTO-LITHO., WASHINGTON, D. C.

UNITED STATES PATENT OFFICE.

ERNST WILHELM GUSTAV CARL HOFFMANN, OF CHARLOTTENBURG, GERMANY, ASSIGNOR TO THE SIEMENS & HALSKE ELECTRIC COMPANY OF AMERICA, OF CHICAGO, ILLINOIS.

ELECTRIC BRAKE.

SPECIFICATION forming part of Letters Patent No. 606,167, dated June 21, 1898.

Application filed December 29, 1897. Serial No. 664,388. (No model.) Patented in Germany April 14, 1896, No. 92,769.

*To all whom it may concern:*

Be it known that I, ERNST WILHELM GUSTAV CARL HOFFMANN, a subject of the Emperor of Germany, residing at Charlottenburg, Germany, have invented new and useful Improvements in Electric Brakes, (Case No. 92,) of which the following is a specification, reference being had to the accompanying drawing, forming part of the specification, for which Letters Patent have been granted in Germany, No. 92,769, dated April 14, 1896.

My invention relates to improvements in electric-brake systems, and has for its object the provision of means for securing a braking system of the highest efficiency for trains or single vehicles and which, moreover, under certain conditions insures automatic actuation of the brakes.

It is well known that the highest efficiency of any braking device is secured when the wheels to which the brakes are applied are impeded in their rotation as much as possible without involving their slipping upon the rails whereon they travel. Accordingly it is desirable in any braking appliance to secure automatically this maximum effect and prevent at all times any sliding of the wheels under the action of the brakes. The electrical braking system of my invention is capable of securing these results, it being impossible by its employment to obtain an excessive pressure of the brakes, while an accidental disconnection of any portion of the train or injury to the brake-controlling circuit serves automatically to operate the brakes until the several cars of the train lose their momentum.

The system of my invention may be briefly described as consisting in providing upon the controlled train or vehicle a dynamo or dynamos mechanically connected with the wheels thereof and adapted to be driven thereby, said dynamos being electrically connected with and adapted to actuate the brakes thereof, electromagnetic or other suitable appliances being connected with said dynamos and adapted normally to prevent their actuation by the movement of the vehicle or train, whereby the braking-current is generated.

My said invention will be more readily understood by reference to the accompanying drawing, wherein is illustrated diagrammatically a braking system constructed in accordance with my invention, the said diagram indicating the brake appliances of a locomotive and car and the controlling apparatus for the same provided in the cab of said locomotive.

The same letter and figures of reference are used to designate like parts wherever they occur in the said drawing.

The dynamos $a$ of my braking system are pivotally mounted, by means of arms $a'$, in position before the respective wheels $b$ of the train, so that the spring $c$, connected with said arms, when permitted to act will engage the friction-disks $d'$, connected with the dynamo-armatures $d$, with the respective wheels, thus securing the rotation of each armature and the generation of electric current within its coils.

The dynamos $a$ are respectively connected with any suitable electromagnetic brake appliances $e$, which are adapted to act upon and impede the rotation of the car-wheels when current is passing through the coils $e'$.

Any desired form of electromagnetic brake may be employed in connection with said system, the same constituting no part of my invention and being herein diagrammatically illustrated by electromagnetic brake-blocks adapted to engage the wheels when energizing-current is supplied thereto.

The dynamos $a$ are provided with two field-windings $a^2$ $a^3$, which are respectively connected with a train-controlling circuit and in series with the armature-circuit as well as with conductors $f f'$, affording a shunt-circuit to ground. The train-controlling circuit, consisting of conductors $g g'$, extends from the cab of the locomotive to the apparatus provided upon the cars of the train, being grounded at the end of said train. Conductor $f'$ also extends throughout the length of the train and is connected with the several brake-dynamos, being also grounded at the end of the train. The conductors $g' f'$ therefore must be electrically united between the cars in order to insure the proper operation of the braking system, and a ground for each of the said conductors must be provided beyond the last brake appliance connected in circuit with the system.

Upon each car or vehicle of the train in the system herein specifically shown is provided an electromagnetic controlling device $h''$, disposed adjacent to each dynamo $a$, the said device consisting of an electromagnet $h$, associated with and serving to oppose the force of the spring $c$. The helices $h'$ of the electromagnet are connected serially with the conductors $g\ g'$ of the controlling-circuit, as are also the secondary windings $a^2$ of the several dynamo-electric machines. In the cab of the locomotive is placed a rheostat $j$, with which the conductors $g$ and $f$ are connected, the said rheostat being provided with contacts electrically connected with variable resistances $k'\ k^2$, &c., the said contacts being adapted successively to be engaged by the contact-arm $j'$ of the rheostat and connect varying resistances in circuit with the conductor $f$, electrically united with said arm. The contacts $l\ l'$ of said rheostat are respectively connected with the conductor $g$ of the controlling-circuit and a grounded source of electrical energy or generator $m$ and ammeter $n$. A contact part $l^2$, moving with contact-arm $j'$, is adapted to electrically unite contacts $l\ l'$ when the said arm $j'$ is in position 1, (shown in the drawing,) thus securing the flow of current from the generator $m$ through the conductor $m'$ and the rheostat-contacts, conductors $g$ and $g'$, and the several windings $h'$ $a^2$ to ground at the end of the train. This flow of current through the controlling-circuit serves, through the medium of the electromagnets $h$, to overcome the force of the springs $c$ and withdraw the friction-disks $d'$ of the several dynamos from their respective car-wheels, thereby preventing the actuation of said dynamos and further serves to polarize the fields by means of the windings $a^2$, provided thereon. This, however, will require only a slight expenditure of the electrical energy supplied by the generator $m$ to the controlling-circuit, which is the normal running condition of the train.

Assuming now that the brakes are to be applied, the engineer will move the contact-arm $j'$ slowly to the left, thereby cutting resistance into the shunt-circuit of the dynamos $a$ and opening the controlling-circuit at $l\ l'$. This deënergizes the electromagnets $h$ and permits the friction-disks $d'$ to engage the wheels of the train $b$, by which they are driven, and current is at once generated, which is conducted to the braking devices $e$ and to the shunt-circuit $f f'$. Inasmuch as the latter, however, affords comparatively a low-resistance path, the braking effect is but slight, since the major portion of the current flows through the shunt-circuit to ground. As the resistance, however, is increased by the further movement of the arm $j'$ to the left from position 2 toward position 3, serving to cut in more resistance $k^2\ k^3$, &c., the greater portion of the current generated by the dynamos will be directed through the coils $e'$ and the wheels will be further impeded in their movement. When the contact-arm is moved to position 4, the shunt-circuit is opened and the full power of the dynamos is exerted upon the electromagnetic brakes.

Inasmuch as the dynamos are driven by the rotation of the car-wheels, to which the brakes are applied, it is impossible for an excessive braking action to occur, since any reduction in the speed of the wheels' rotation correspondingly reduces the generation of current by the dynamos and the retarding action of the brakes. The velocity of the train and the rate at which the car-wheels are rotated secure a corresponding increase or decrease in the flow of current through the braking-circuit. Should an extra braking effect be desired, the contact-arm is rotated to position 5—as, for example, when the train is descending a gradient—when the generator $m$ will be connected in circuit with conductor $f$, which will serve materially to strengthen the field of force in dynamos $a$.

By means of the rheostat $j$ the engineer is enabled to adjust the condition of the braking system to the length of the train which he may have to control and, further, is enabled to secure very close adjustment of the braking action of the several dynamos upon the car-wheels.

It will be seen that the system is entirely automatic in its action when a portion of a train, for instance, becomes accidentally detached, since the flow of current through the controlling-circuit $g\ g'$ and the shunt-circuit of the dynamos $f f'$ is thereby interrupted, and the dynamos upon the several cars are permitted to act with their full force the same as if the brakes were set manually by the engineer.

If desired, a switch $o$ may be provided upon each of the cars, which will serve to interrupt the circuit through conductor $g'$ and secure a partial braking action, which will be noticed by the engineer, and the rheostat $j$ will be adjusted to bring the entire train to a standstill.

The ammeters $n\ n'$ permit the engineer to observe the conditions of the respective circuits and ascertain whether the braking system is in proper condition.

It will be seen that upon electrically-propelled vehicles the controlling-circuit, if desired, may be connected directly with the main source of power, thereby obviating the necessity of a separate generator $m$, as diagrammatically shown, upon the locomotive. It is also unnecessary to provide dynamos upon each car of the train, since the same when affording sufficient power may be reduced in number to suit the needs of any specific system. For example, assuming that the portions of the conductors $g'\ f'$ upon the extreme right of the drawing represent additional cars of the train herein diagrammatically shown it will be seen that any suitable number of brake appliances $e$ may be connected in circuit with conductor $f'$ which the actuating-dynamos $a$ are capable of operating, thereby successfully applying the brakes throughout the entire train.

By employing the braking system of my invention the brake moment is always automatically adapted to the existing condition of the train, since the movement of the train at different velocities secures a corresponding actuation of the brakes.

Numerous modifications may be made in the braking system of my invention without departing from the spirit thereof, and I do not desire to be understood as limiting the same to the precise embodiment herein described and diagrammatically illustrated; but, Having described a system equipped in accordance with my invention, I claim as new, and desire to secure by Letters Patent, the following:

1. In an electric braking system, the combination with a dynamo suitably mounted to be driven by the movement of the controlled wheel or wheels, of an electromagnetic brake appliance connected with said dynamo, a controlling-circuit, and an electromagnetic controlling device connected in said circuit adapted to secure the transmission of current from said dynamo to the brake appliance when the said device is actuated, substantially as described.

2. In a braking system for cars or vehicles, the combination with a dynamo connected with and driven by the wheels of the car or vehicle, of an electromagnetic brake appliance connected with the said dynamo and adapted to be actuated thereby, a controlling-circuit, and an electromagnetic controlling device connected in said controlling-circuit adapted normally to prevent the actuation of the brake appliance by the said dynamo-electric machine, substantially as described.

3. The combination with a dynamo-electric machine $a$ adapted to be driven by the controlled wheel or part, of an electromagnetic brake appliance $e$ electrically connected with said dynamo, a controlling-circuit $g$ $g'$, a circuit-controlling device $j$, and an electromagnetic device $h''$ associated with said dynamo and adapted normally to prevent the actuation of the dynamo by the controlled wheel or part, substantially as described.

4. The combination in an electric-brake system with a dynamo $a$ adapted to be moved into and out of operative engagement with the controlled wheel $b$ by which the same is adapted to be driven, of an electromagnetic brake appliance acting upon said wheel, a controlling-circuit $g$ $g'$, a controller $j$, and an electromagnetic controlling device $h''$ connected in said circuit adapted to secure the operative connection and disconnection of the dynamo with the actuating-wheel $b$, substantially as described.

5. The combination with a dynamo-electric machine $a$ adapted to be driven by the controlled wheel or part, of an electromagnetic brake appliance $e$ electrically connected with said dynamo, a controlling-circuit $g$ $g'$, a circuit-controlling device $j$, and an electromagnetic controlling device $h''$ associated with the dynamo and adapted normally to prevent the actuation of the brake appliance by said dynamo, substantially as described.

6. The combination with a dynamo-electric machine $a$ adapted to be driven by the controlled wheel or part, the said dynamo having a normally-excited field-winding $a^2$, of an electromagnetic brake appliance $e$ electrically connected with said dynamo, a controlling-circuit $g$ $g'$, a circuit-controlling device $j$, and an electromagnetic device $h''$ associated with said dynamo and adapted normally to prevent the actuation of the dynamo by the controlled wheel or part, substantially as described.

7. The combination with a dynamo-electric machine $a$ adapted to be driven by the controlled wheel or part, the said dynamo being provided with means for augmenting its normal field of force, of an electromagnetic brake appliance $e$ electrically connected with said dynamo, a controlling-circuit $g$ $g'$, a circuit-controlling device $j$, and an electromagnetic device $h''$ associated with the dynamo and adapted normally to prevent the actuation of the brake appliance by said dynamo, substantially as described.

8. In an electric braking system, the combination with a dynamo-electric machine $a$ adapted to be driven by the rotation of the controlled wheel or part, of an electromagnetic brake appliance connected with said dynamo and adapted to be actuated thereby, a controlling device $h''$ associated with said dynamo and adapted normally to prevent the actuation of the brake appliance by said dynamo, and means for governing the controlling device, substantially as described.

In testimony whereof I affix my signature in the presence of two witnesses.

ERNST WILHELM GUSTAV CARL HOFFMANN.

Witnesses:
HENRY HARPER,
CHARLES H. DAY.